(12) United States Patent
Yanagisawa et al.

(10) Patent No.: US 6,197,882 B1
(45) Date of Patent: Mar. 6, 2001

(54) CURABLE RESIN COMPOSITION AND ADHESIVE

(75) Inventors: Hideyoshi Yanagisawa; Masaaki Yamaya, both of Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/363,050

(22) Filed: Jul. 29, 1999

(30) Foreign Application Priority Data

Jul. 30, 1998 (JP) .................................................. 10-229327

(51) Int. Cl.$^7$ ............................ C08K 5/29; C08K 5/5465
(52) U.S. Cl. ........................... 525/102; 556/413; 556/482; 528/38; 528/421; 528/44; 525/452; 525/523
(58) Field of Search ..................... 556/413, 482; 528/38, 421, 44; 525/452, 523, 102

(56) References Cited

U.S. PATENT DOCUMENTS

| | | |
|---|---|---|
| 2,942,019 | 6/1960 | Pike et al. . |
| 4,378,250 | * 3/1983 | Treadway et al. . |
| 4,555,561 | 11/1985 | Sugimori et al. . |
| 4,694,093 | 9/1987 | Sugimori et al. . |

FOREIGN PATENT DOCUMENTS

| | | |
|---|---|---|
| 3414877A1 | 10/1985 | (DE) . |
| 0072473A2 | 2/1983 | (EP) . |
| 0890594A1 | 1/1999 | (EP) . |
| 55-75469 | 6/1980 | (JP) . |
| 25711582 | 3/1982 | (JP) . |
| 2-219866 | 5/1990 | (JP) . |
| 3-263421 | 11/1991 | (JP) . |

OTHER PUBLICATIONS

Patent Abstracts of Japan, vol. 1996, No. 05 (May. 31, 1996) & JP 08 027447A (Jan. 30, 1996) Abstract.

Database WPI, Week 9727, An 295215, XP0002121586, "Adhesive Composition" & JP 09 111220 A (Apr. 28, 1997) Abstract.

Database WPI, Week 9547, AN 363581, XP 002121587, "Manufacture Organic Silicon Compound" & JP 07 247294 A (Sep. 26, 1995) Abstract.

* cited by examiner

*Primary Examiner*—Robert Dawson
*Assistant Examiner*—Kuo-Liang Peng
(74) *Attorney, Agent, or Firm*—Birch, Stewart, Kolasch and Birch, LLP

(57) ABSTRACT

A curable resin composition contains (A) a curable resin and (B) a ketimine structure-bearing organosilicon compound obtained by reacting an amino-functional alkoxysilane with a monocarbonyl compound, the organosilicon compound having a monomer purity of 50–95% and an amino group blockage of at least 90%. The composition has good shelf stability and tight adhesion and is useful as an adhesive.

3 Claims, No Drawings

CURABLE RESIN COMPOSITION AND ADHESIVE

This invention relates to a curable resin composition comprising a curable resin such as an epoxy or urethane resin and a ketimine structure-bearing organosilicon compound. It also relates to an adhesive comprising the same.

BACKGROUND OF THE INVENTION

Organoalkoxysilanes having a ketimine structure are known in the art (see U.S. Pat. No. 2,942,019). The ketimine structure is inactive as such with its amino group remaining non-reactive. Upon contact with moisture or water, the ketimine structure readily degrades to regenerate a primary amino group so that the reactivity of amino group is resumed. By virtue of this characteristic, the ketimine structure can serve as an adhesion modifier when added to mixtures of an epoxy resin and a polyamide resin. It is also known from JP-B 57-11582 to use the ketimine structure as a curing agent. JP-B 2-19866 discloses that a ketimine structure-bearing organosilicon compound obtained by reacting an aminosilane with a dicarbonyl compound is used as an additive to polyurethane resins. JP-A 3-263421 discloses that the ketimine structure-bearing organosilicon compound serves as an adhesion modifier and curing agent in mixtures of an epoxy resin and a modified silicone resin.

Analyzing the ketimine structure-bearing organosilicon compounds used in these known resin compositions and adhesives, the inventor found that these compounds have not completed reaction and some of the amino group-containing organosilicon compound used as the reactant is left in the system. Since water resulting from the synthesis has not been fully removed from the system, the end compound contains a substantial proportion of oligomers and is not fully shelf stable.

SUMMARY OF THE INVENTION

An object of the invention is to provide a novel and improved curable resin composition comprising a ketimine structure-bearing organosilicon compound which is shelf stable and highly adhesive. Another object is to provide an adhesive comprising the composition.

The invention provides a curable resin composition comprising (A) a curable resin and (B) a ketimine structure-bearing organosilicon compound obtained by reacting an amino group-containing organosilicon compound of the following general formula (1) with a monocarbonyl compound of the following general formula (2).

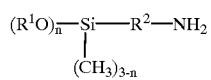
(1)

$R^1$ is a monovalent hydrocarbon group of 1 to 4 carbon atoms, $R^2$ is a divalent hydrocarbon group of 1 to 10 carbon atoms, and n is equal to 1, 2 or 3.

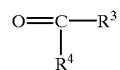
(2)

$R^3$ and $R^4$ each are hydrogen or a monovalent hydrocarbon group of 1 to 10 carbon atoms, with the proviso that both $R^3$ and $R^4$ are not hydrogen at the same time, and $R^3$ and $R^4$ may form a cyclic structure with the carbon atom of the carbonyl group. The ketimine structure-bearing organosilicon compound should have a monomer purity of 50 to 95% and an amino group blockage of at least 90%. This resin composition is shelf stable and remains highly adhesive.

Also contemplated herein is an adhesive comprising the curable resin composition defined above.

DESCRIPTION OF THE PREFERRED EMBODIMENTS

The curable resin composition of the invention contains (A) a curable resin and (B) a ketimine structure-bearing organosilicon compound as essential components.

The curable resin (A) may be selected from among epoxy resins, phenolic resins, urethane resins, melamine resins, polyimide resins, and furan resins, and mixtures of two or more of these resins. Of these, epoxy and urethane resins are desirable.

Any of prior art well-known epoxy resins may be used. Examples include bisphenol A and bisphenol F type epoxy resins obtained by reacting bisphenol A or bisphenol F with epichlorohydrin, hydrogenated ones of these epoxy resins, glycidyl ester type epoxy resins, novolac type epoxy resins, urethane-modified epoxy resins, nitrogenous epoxy resins, and rubber-modified epoxy resins.

Any of prior art well-known urethane resins may be used. Exemplary urethane resins are those based on urethane prepolymers obtained by reacting polyols such as polyoxyalkylene polyols, polyester polyols, hydroxyl group-containing polybutadiene polyols, acrylic polyols, castor oil derivatives, and tall oil derivatives, with an excess of polyisocyanate compounds.

Component (B) is a ketimine structure-bearing organosilicon compound which is obtained by reacting an amino group-containing organosilicon compound of the following general formula (1) with a monocarbonyl compound of the following general formula (2).

Formula (1):

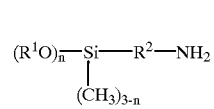
(1)

In formula (1), $R^1$ is a monovalent hydrocarbon group of 1 to 4 carbon atoms, $R^2$ is a divalent hydrocarbon group of 1 to 10 carbon atoms, and n is equal to 1, 2 or 3.

Illustrative groups represented by $R^1$ are alkyl groups such as methyl, ethyl, propyl and butyl, and alkenyl groups such as vinyl, allyl, propenyl and butenyl, with the alkyl groups being preferred. Illustrative groups represented by $R^2$ are alkylene groups such as methylene, ethylene, propylene and butylene, arylene groups such as phenylene, and alkylene arylene groups, with the alkylene groups being preferred. The letter n is preferably equal to 2 or 3.

Illustrative examples of the amino group-containing organosilicon compound of formula (1) are given below.

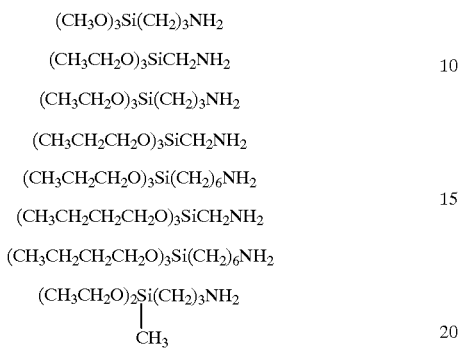

Of these, the following compounds are preferred on practical use.

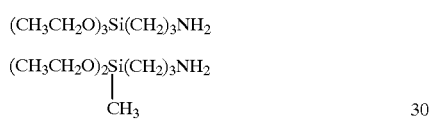

Formula (2):

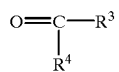
(2)

In formula (2), R³ and R⁴ each are hydrogen or a monovalent hydrocarbon group of 1 to 10 carbon atoms, with the proviso that both R³ and R⁴ are not hydrogen at the same time, and R³ and R⁴ may form a cyclic structure with the carbon atom of the carbonyl group.

Exemplary groups represented by R³ and R⁴ include hydrogen, alkyl groups such as methyl, ethyl, propyl, butyl, cyclohexyl and octyl, aryl groups such as phenyl and tolyl, aralkyl groups such as benzyl and phenylethyl, and substituted ones of these groups in which some or all of the hydrogen atoms are replaced by halogen atoms. Both R³ and R⁴ are not hydrogen at the same time. R³ and R⁴ may bond together to form a divalent saturated hydrocarbon group (such as an alkylene group of 5 to 10 carbon atoms) which forms a cyclic structure with the carbon atom of the carbonyl group.

Illustrative examples of the monocarbonyl compound of formula (2) are given below. In the following formulae, Ph is phenyl.

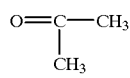

-continued

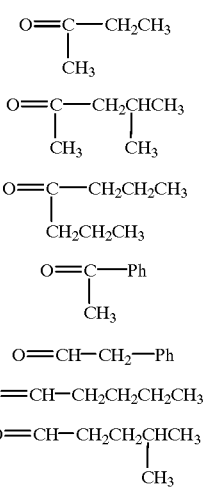

Of these, the following compounds are preferable because they are more hydrophobic.

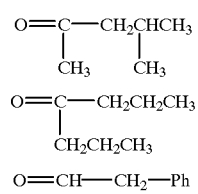

The ketimine structure-bearing organosilicon compound used herein may be prepared by any desired method although the following method is preferred in order to prepare the end compound having a monomer purity of 50 to 95% and an amino group blockage (or percentage of blocked amino groups) of at least 90%. An amino group-containing organosilicon compound or amino-functional alkoxysilane is reacted with a monocarbonyl compound by introducing the amino-functional alkoxysilane to the monocarbonyl compound under heating. During this introduction, reaction takes place to form water which is azeotroped off with the monocarbonyl compound. The molar ratio of the monocarbonyl compound to the amino-functional alkoxysilane is preferably 2/1 to 10/1, and more preferably from 3/1 to 5/1. If the monocarbonyl compound is less than 2 mol per mol of the amino-functional alkoxysilane, active amino groups would be left after reaction, failing to achieve an amino group blockage of at least 90%. Thus the molar ratio should preferably be at least 2. If the molar ratio exceeds 10, the pot yield would become too low, leading to an increased cost.

The temperature at which the amino-functional alkoxysilane is introduced, that is, reaction temperature is preferably from approximately the azeotropic temperature of a mixture of the monocarbonyl compound and water to approximately the reflux temperature of the monocarbonyl compound. In one typical example, the monocarbonyl compound is methyl isobutyl ketone which is reacted with an amino-functional alkoxysilane. A mixture of methyl isobutyl ketone and water has an azeotropic temperature of about 80° C. and methyl isobutyl ketone has a reflux temperature of 130° C. Then the introduction temperature of the amino-functional alkoxysilane may be from 80 to 130° C.

The manner of introducing the amino-functional alkoxysilane for reaction is arbitrary. Preferably the amino-functional alkoxysilane is introduced into a solution of the monocarbonyl compound in order that the alkoxysilane quickly react with the monocarbonyl compound. The introduction time is arbitrary although it is preferably about ½ to about 20 hours. Since the reaction product will hydrolyze in the presence of moisture, the reaction is preferably carried out in an inert gas such as nitrogen or argon. It is preferable to minimize the water content of the monocarbonyl compound.

As described above, the ketimine structure-bearing organosilicon compound is preferably prepared by introducing the amino-functional alkoxysilane to the monocarbonyl compound under heating for reaction, and azeotroping off water (resulting from reaction) with the monocarbonyl compound during the introduction. After the completion of introduction of the amino-functional alkoxysilane, azeotropic distillation of water with the monocarbonyl compound is preferably continued in order to remove water from the system.

To this end, an appropriate distilling temperature is selected. In one preferred mode, the temperature is raised to the reflux temperature of the monocarbonyl compound and distillation is continued for about ½ to about 2 hours after the reflux temperature is reached. Alternatively, immediately after the completion of introduction of the amino-functional alkoxysilane, the unreacted monocarbonyl compound is distilled off from the system by vacuum concentration. It is noted that although continuous distillation for about ½ to about 2 hours after reaching the reflux temperature causes the system to be depleted of water and renders the system stable so that hydrolytic condensation may no longer proceed, it is desirable to distill off the unreacted monocarbonyl compound from the system as fast as possible. The end ketimine structure-bearing organosilicon compound is thus obtained in admixture with alkoxysilane oligomers resulting from hydrolytic condensation of alkoxy groups. As compared with the prior art process, the content of oligomers is very low and the content of residual amino groups is also low. To recover the product in high purity, the ketimine structure-bearing organosilicon compound can be isolated by distillation. However, the product isolated by distillation becomes not only expensive, but also less adhesive. This is undesirable for use in the curable resin composition and the adhesive according to the invention.

The ketimine structure-bearing organosilicon compound used herein is the one prepared by the above-described method to a monomer purity or content of 50 to 95%, preferably 70 to 95%, more preferably 80 to 95%, and an amino group blockage of at least 90%, preferably at least 95%. If the monomer purity is less than 50%, the composition becomes less stable during shelf storage. A monomer purity of more than 95% renders the composition less adhesive. An amino group blockage of less than 90% detracts from the shelf stability of the composition.

In addition to the curable resin and the ketimine structure-bearing organosilicon compound as essential components, the curable resin composition of the invention may contain other components, for example, curing agents, fillers, pigments, dyes, antioxidants, antistatic agents, UV absorbers, leveling agents, plasticizers, and dehydrating agents. There may also be added solvents, for example, ketones such as methyl ethyl ketone and methyl isobutyl ketone, esters such as ethyl acetate and methyl acetate, aromatic hydrocarbons such as toluene and xylene, aliphatic hydrocarbons such as pentane, hexane and decane, and ethers such as tetrahydrofuran and propylene glycol monomethyl ether.

The adhesive of the invention is comprised of the curable resin composition defined above. The adhesive is suitable for forming a bond between inorganic members such as glass plates, mica plates, and metal plates such as aluminum, iron, copper and stainless steel, plastic members such as polyethylene, polypropylene, polyesters, acrylic resins, polycarbonate resins, and polyvinyl chloride resins, and members of wood and paper, and between any two of these members.

EXAMPLE

Examples of the invention are given below by way of illustration and not by way of limitation. All parts are by weight.

Synthesis Example 1

A 1-liter separable flask equipped with a nitrogen inlet tube, thermometer, ester adapter, Dimroth condenser, and dropping funnel was charged with 500 g (5.0 mol) of methyl isobutyl ketone. Under a nitrogen gas stream, 221 g (1.0 mol) of 3-aminopropyltriethoxysilane was slowly added dropwise at 110° C. This dropwise addition was continued for one hour. After 15 minutes from the start of addition, azeotropic distillation by reflux of methyl isobutyl ketone and water formed was commenced. The distillate amount collected until the end of dropwise addition of 3-aminopropyltriethoxysilane was 130 g. Distillation was further continued by heating to an internal temperature of 130° C. The distillate amount eventually summed to 380 g. Immediately thereafter, the residual or unreacted methyl isobutyl ketone was distilled off under vacuum at 80° C., leaving a yellow clear liquid. The product showed physical properties including a viscosity of 3.4 centistokes, a specific gravity of 0.920 and a refractive index of 1.4436, as measured at 25° C. The product was analyzed by IR absorption spectroscopy, finding no absorption of NH. $CH_3MgI$ was added to an aliquot whereupon $CH_4$ gas evolved which was collected by a gas burette. By quantitative analysis, the amount of active hydrogen was found to be 2.05 cc/g. Since the amount of active hydrogen at a conversion of 0% is 101 cc/g, it was confirmed that this compound had an amino group blockage of 98.0%. On gas chromatographic analysis using decane as the internal standard, the product was found to have a monomer content of 85%.

Synthesis Example 2

In Example 1, the flask was charged with 3-aminopropyltriethoxysilane along with methyl isobutyl ketone. By heating and processing as in Example 1, azeotroping off water formed along with methyl isobutyl ketone, and subsequently processing as in Example 1, there was obtained a yellow clear liquid having a viscosity of 9.91 centistokes, a specific gravity of 0.943 and a refractive index of 1.4432 at 25° C. The product had an amino group blockage of 96.1% and a monomer content of 43%.

Synthesis Example 3

In Example 1, the flask was charged with 200 g (2.0 mol) of methyl isobutyl ketone. By processing as in Example 1, azeotroping off water formed along with methyl isobutyl ketone, and subsequently processing as in Example 1, there was obtained a yellow clear liquid having a viscosity of 4.5 centistokes, a specific gravity of 0.930 and a refractive index of 1.4427 at 25° C. The product had an amino group blockage of 83.5% and a monomer content of 89%.

Synthesis Example 4

A 1-liter separable flask equipped with a nitrogen inlet tube, thermometer, ester adapter, Dimroth condenser, and dropping funnel was charged with 500 g of toluene, 221 g (1.0 mol) of 3-aminopropyltriethoxysilane and 200 g of a molecular sieve as a dehydrating agent. With stirring at room temperature, 200 g (2 mol) of methyl isobutyl ketone was added dropwise. After the completion of addition, agitation was continued for a further 4 hours at room temperature to drive reaction. At the end of reaction, the molecular sieve was filtered off and the toluene and unreacted methyl isobutyl ketone were distilled off in vacuum. The product had an amino group blockage of 88.5% and a monomer content of 23.4%.

Synthesis Example 5

A 1-liter separable flask equipped with a nitrogen inlet tube, thermometer, ester adapter, Dimroth condenser, and dropping funnel was charged with 500 g of toluene and 221 g (1.0 mol) of 3-aminopropyltriethoxysilane. With stirring at room temperature, 200 g (2 mol) of methyl isobutyl ketone was added dropwise. After the completion of addition, the reaction solution was heated to distill off the toluene and water at 110 to 120° C. and drive reaction. At the end of reaction, the toluene and unreacted methyl isobutyl ketone were distilled off in vacuum. The product had an amino group blockage of 82.2% and a monomer content of 14.8%.

Synthesis Example 6

A 1-liter separable flask equipped with a nitrogen inlet tube, thermometer, ester adapter, Dimroth condenser, and dropping funnel was charged with 300 g (3 mol) of methyl isobutyl ketone and 57 g of magnesium sulfate. With stirring at room temperature, 221 g (1.0 mol) of 3-aminopropyltriethoxysilane was added dropwise. After the completion of addition, the reaction solution was stirred for a further 5 hours at room temperature. Immediately after the completion of reaction, the hydrated magnesium sulfate was filtered off and the low-boiling fraction was distilled off in vacuum. The product had an amino group blockage of 94.6% and a monomer content of 33.3%.

Synthesis Example 7

The ketimine-bearing organosilicon compound synthesized in Example 1 was isolated by distillation, collecting a fraction having an amino group blockage of 98.6% and a monomer content of 97.8%.

EXAMPLE 1

A resin composition was prepared by blending 5 g of the ketimine-bearing organosilicon compound synthesized in Synthesis Example 1, 50 g of an epoxy resin (Epikoat 827 by Yuka Shell Epoxy K. K.) and 50 g of toluene. To evaluate shelf stability, the composition was kept at 50° C. for 14 days while its viscosity (centistoke) was measured at intervals. The results are shown in Table 1.

COMPARATIVE EXAMPLES 1–6

Resin compositions were prepared as in Example 1 except that the ketimine-bearing organosilicon compounds synthesized in Synthesis Examples 2 to 7 were used. They were similar evaluated for shelf stability. The results are shown in Table 1.

TABLE 1

| | Viscosity (centistoke) | | | | | |
|---|---|---|---|---|---|---|
| | Initial | 1 day | 3 days | 5 days | 7 days | 14 days |
| E1 | 4.19 | 4.28 | 4.38 | 4.46 | 4.55 | 4.80 |
| CE1 | 4.22 | 4.34 | 4.46 | 4.60 | 4.73 | 5.10 |
| CE2 | 4.13 | 5.10 | 5.55 | 5.98 | 6.10 | 6.23 |
| CE3 | 4.20 | 4.95 | 5.43 | 5.90 | 6.06 | 6.20 |
| CE4 | 4.24 | 5.02 | 5.60 | 5.99 | 6.15 | 6.24 |
| CE5 | 4.20 | 4.45 | 4.50 | 4.64 | 4.69 | 5.08 |
| CE6 | 4.13 | 4.20 | 4.30 | 4.41 | 4.50 | 4.75 |

As is evident from Table 1, the curable resin composition within the scope of the invention keeps good stability with the lapse of time as compared with the curable resin compositions containing prior art known ketimine-bearing organosilicon compounds (Comparative Examples 1–5). The inventive composition shows equivalent shelf stability to the curable resin composition containing a distillation-purified product (Comparative Example 6).

EXAMPLE 2 & COMPARATIVE EXAMPLES 7–12

Epoxy resin compositions were prepared in accordance with the formulation shown in Table 2. Aluminum and iron plates were bonded with the compositions and their bond was examined. The bonded assembly was boiled for 3 hours and the bond was examined again. The bond was rated "Excellent" when members were firmly bonded and could not be separated, "Good" when members were firmly bonded, but could be separated by force, and "Fair" when members were bonded, but could be readily separated.

The results are shown in Table 3.

TABLE 2

| | Formulation | | |
|---|---|---|---|
| | Epikoat 827 | Compound of Synthesis Example | Triethylene-tetramine |
| E2 | 50 parts | SE1 1 part | 5 parts |
| CE7 | 50 parts | SE2 1 part | 5 parts |

TABLE 2-continued

| | Formulation | | |
|---|---|---|---|
| | Epikoat 827 | Compound of Synthesis Example | Triethylene-tetramine |
| CE8 | 50 parts | SE3 1 part | 5 parts |
| CE9 | 50 parts | SE4 1 part | 5 parts |
| CE10 | 50 parts | SE5 1 part | 5 parts |
| CE11 | 50 parts | SE6 1 part | 5 parts |
| CE12 | 50 parts | SE7 1 part | 5 parts |

TABLE 3

| | Bond test | | | |
|---|---|---|---|---|
| | Aluminum plates | | Iron plates | |
| | Initial | After 3 hr boiling | Initial | After 3 hr boiling |
| E2 | Excellent | Good | Excellent | Good |
| CE7 | Excellent | Fair | Excellent | Fair |
| CE8 | Excellent | Fair | Excellent | Fair |
| CE9 | Excellent | Good | Excellent | Good |
| CE10 | Excellent | Fair | Excellent | Fair |
| CE11 | Excellent | Fair | Excellent | Good |
| CE12 | Good | Fair | Good | Fair |

As is evident from Table 3, the curable resin composition within the scope of the invention keeps a firm bond unchanged as compared with the curable resin compositions containing prior art known ketimine-bearing organosilicon compounds (Comparative Examples 7–11). The inventive composition shows a superior bond to the curable resin composition containing a distillation-purified product (Comparative Example 12).

The curable resin composition of the invention keeps good shelf stability against aging and is useful as an adhesive because it ensures tight adhesion.

Japanese Patent Application No. 10-229327 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A curable resin composition comprising (A) a curable resin and (B) a ketimine structure-bearing organosilicon compound obtained by reacting an amino group-containing organosilicon compound of the following general formula (1):

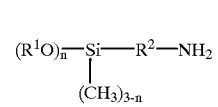

(1)

wherein $R^1$ is a monovalent hydrocarbon group of 1 to 4 carbon atoms, $R^2$ is a divalent hydrocarbon group of 1 to 10 carbon atoms, and n is equal to 1, 2 or 3, with a monocarbonyl compound of the following general formula (2):

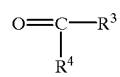

(2)

wherein $R^3$ and $R^4$ each are hydrogen or a monovalent hydrocarbon group of 1 to 10 carbon atoms, with the proviso that both $R^3$ and $R^4$ are not hydrogen at the same time, and $R^3$ and $R^4$ may form a cyclic structure with the carbon atom of the carbonyl group, said ketimine structure-bearing organosilicon compound having a monomer purity of 50 to 95% and an amino group blockage of at least 90%.

2. The curable resin composition of claim 1 wherein the curable resin (A) comprises an epoxy resin or urethane resin.

3. An adhesive comprising the curable resin composition of claim 1.

* * * * *